US011452016B2

(12) United States Patent
Zhang et al.

(10) Patent No.: US 11,452,016 B2
(45) Date of Patent: Sep. 20, 2022

(54) DUAL-PROTOCOL FOR MOBILITY ENHANCEMENT

(71) Applicant: MediaTek Singapore Pte. Ltd., Singapore (SG)

(72) Inventors: Yuanyuan Zhang, Beijing (CN); Chun-Fan Tsai, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/989,992

(22) Filed: Aug. 11, 2020

(65) Prior Publication Data

US 2020/0374773 A1 Nov. 26, 2020

Related U.S. Application Data

(63) Continuation of application No. PCT/CN2019/093005, filed on Jun. 26, 2019.

(51) Int. Cl.
*H04W 36/18* (2009.01)
*H04W 76/34* (2018.01)
(Continued)

(52) U.S. Cl.
CPC ........ *H04W 36/18* (2013.01); *H04L 41/0816* (2013.01); *H04L 69/18* (2013.01);
(Continued)

(58) Field of Classification Search
CPC . H04W 36/18; H04W 12/0433; H04W 76/34; H04W 76/10; H04W 36/305;
(Continued)

(56) References Cited

U.S. PATENT DOCUMENTS

2017/0164234 A1 6/2017 Kalapatapu et al. ......... 370/235
2018/0132158 A1* 5/2018 Tseng ................ H04W 36/0088
(Continued)

FOREIGN PATENT DOCUMENTS

WO WO2017099961 A1 6/2017

OTHER PUBLICATIONS

International Search Report and Written Opinion of International Search Authority for PCT/CN2019/093005 dated Sep. 26, 2019 (9 pages).
(Continued)

*Primary Examiner* — Mazda Sabouri
(74) *Attorney, Agent, or Firm* — Helen Mao; Zheng Jin; Imperium Patent Works

(57) ABSTRACT

Apparatus and methods are provided to reduce mobility interruption time through dual-protocol stacks for mobility enhancement. In novel aspect, the UE configures a target protocol stack for a target gNB upon receiving a reconfiguration message from a source gNB, performs random access procedure and establishes RRC connection with the target gNB through the target protocol stack while simultaneously maintaining data transmission and reception with the source gNB, and releases the source RRC connection with the source gNB and performs data transmission and reception with the target gNB upon detecting one or more predefined release triggering event. In one embodiment, the target protocol stack includes a PHY layer, a MAC layer, and RLC layer, a PDCP and optionally a SDAP. In one embodiment, the UE enables a PDCP reordering, wherein the PDCP reordering is performed on PDCP packet data units received from the source and the target protocol stacks.

16 Claims, 12 Drawing Sheets

(51) Int. Cl.
*H04W 76/10* (2018.01)
*H04W 36/30* (2009.01)
*H04L 41/0816* (2022.01)
*H04L 69/18* (2022.01)
*H04W 28/02* (2009.01)
*H04W 36/32* (2009.01)
*H04W 74/08* (2009.01)
*H04W 12/0433* (2021.01)
*H04W 80/02* (2009.01)

(52) U.S. Cl.
CPC ... *H04W 12/0433* (2021.01); *H04W 28/0252* (2013.01); *H04W 36/305* (2018.08); *H04W 36/32* (2013.01); *H04W 74/0833* (2013.01); *H04W 76/10* (2018.02); *H04W 76/34* (2018.02); *H04W 80/02* (2013.01)

(58) Field of Classification Search
CPC .............. H04W 28/0252; H04W 36/32; H04W 74/0833; H04W 80/02; H04W 36/026; H04L 41/0816; H04L 69/18
See application file for complete search history.

(56) References Cited

U.S. PATENT DOCUMENTS

| 2018/0317137 | A1* | 11/2018 | Loehr | H04W 36/023 |
| 2019/0110300 | A1* | 4/2019 | Chen | H04W 74/006 |
| 2019/0253945 | A1* | 8/2019 | Paladugu | H04W 76/27 |
| 2020/0260364 | A1* | 8/2020 | Vandervelde | H04W 36/08 |
| 2020/0374690 | A1* | 11/2020 | Yao | H04L 67/18 |
| 2021/0227435 | A1* | 7/2021 | Hsieh | H04W 36/0055 |
| 2021/0352541 | A1* | 11/2021 | Teyeb | H04W 36/0072 |

OTHER PUBLICATIONS

R2-1802408 3GPP TSG-RAN2 #101, MediaTek Inc., "Mobility Enhancement for '0ms Interruption' HO", Athens, Greece, Feb. 26-Mar. 2, 2018 (6 pages) *sections 1-3*.

R2-1802473 3GPP TSG-RAN WG2 #101, Huawei et al., "DC based NR Scheme for 0ms Interruption Handover", Athens, Greece, Feb. 26-Mar. 2, 2018 (7 pages) *sections 1-3*.

R2-1803662 3GGP TSG-RAN WG2 Meeting #101, Qualcomm Incorporated, NR 0ms Interruption HO, Athens, Greece, Feb. 26-Mar. 2, 2018 (8 pages) *sections 1-3*.

* cited by examiner

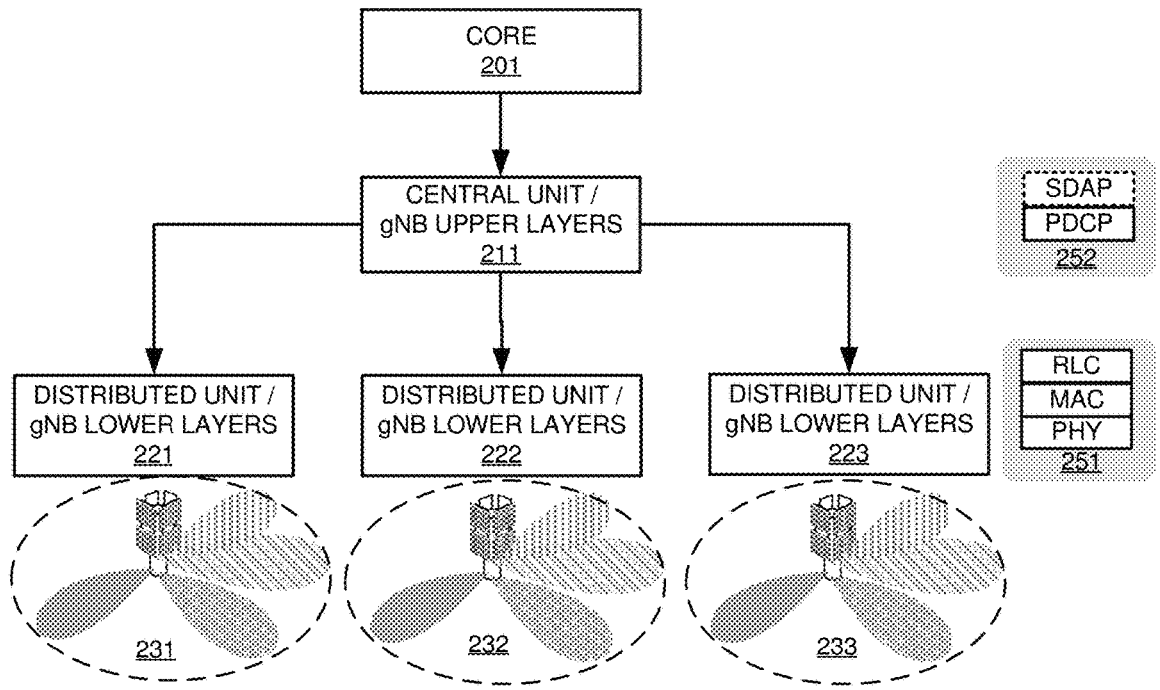
FIG. 2
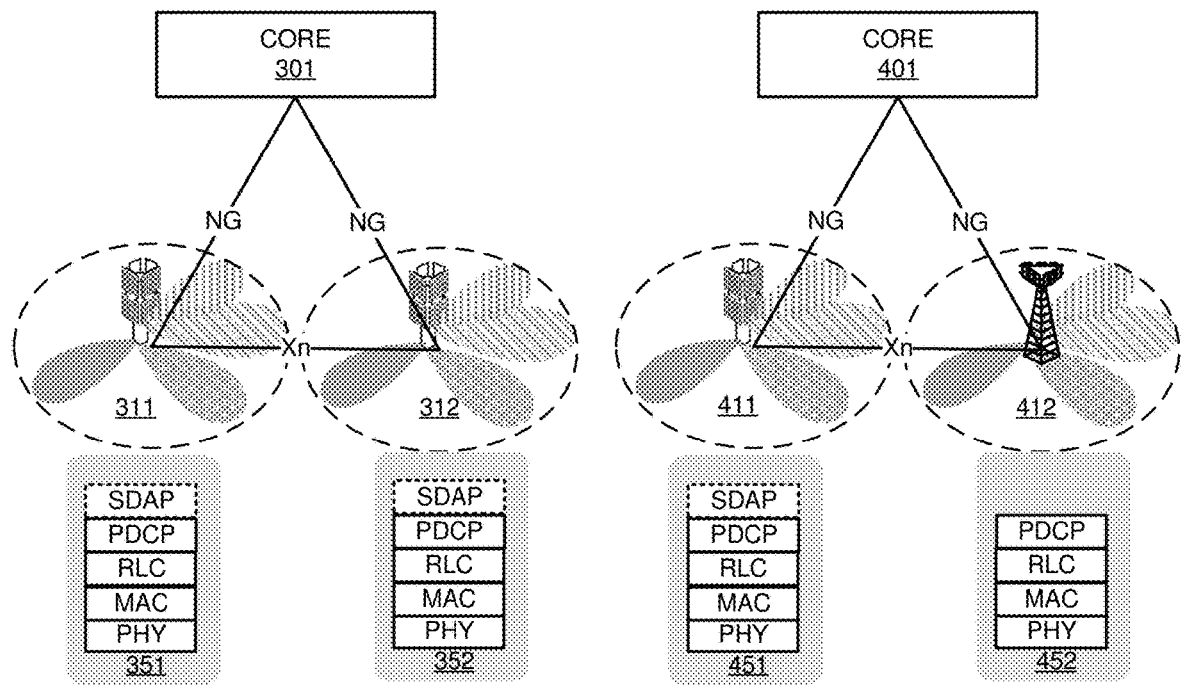
FIG. 3
FIG. 4

DUAL-PROTOCOL FOR MOBILITY ENHANCEMENT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/093005, with an international filing date of Jun. 26, 2019, which in turn claims priority from International Application No. PCT/CN2018/093142 filed on Jun. 27, 2018. This application is a continuation of International Application No. PCT/CN2019/093005, which claims priority from International Application No. PCT/CN2018/093142. International Application No. PCT/CN2019/093005 is pending as of the filing date of this application, and the United States is a designated state in International Application No. PCT/CN2019/093005. The disclosure of each of the foregoing documents is incorporated herein by reference.

TECHNICAL FIELD

The disclosed embodiments relate generally to wireless communication, and, more particularly, to reduce mobility interruption time through dual-protocol stacks for mobility enhancement.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. Both the stand-alone new radio (NR) deployment and the non-standalone NR with LTE/eLTE deployment will be considered. In order to improve the UE experience quality, it's desirable to reduce the mobility interruption time during handover. Mobility interruption time means the shortest time duration supported by the system during which a user terminal cannot exchange user plane packets with any base station during transitions. The target for mobility interruption time should be 0 ms, which is intended for both intra-frequency and inter-frequency mobility for intra-NR mobility. In the current LTE network, the latency during the handover is nearly 50 ms from step-7 receiving a RRCConnectionReconfiguration to step-11 RRCConnectionReConfiguratioComplete. Such latency cannot satisfy the mobility interruption requirement in the NR network. The alternative solution of make-before-break is used to reduce the mobility interruption. Although the latency can be reduced, the interruption due to the random access (RA) procure and the delivering of RRCConnectionReConfiguratioComplete message cannot be avoided. Improvements are required to achieve less mobility interruption during handover.

SUMMARY

Apparatus and methods are provided to reduce mobility interruption time through dual-protocol stacks for mobility enhancement. In one novel aspect, the UE configures a target protocol stack for a target gNB upon receiving a reconfiguration message from a source in a wireless network, wherein the UE performs data transmission and reception with the source gNB through a source protocol stack, performs random access (RA) procedure and establishes RRC connection with the target gNB through the target protocol stack while simultaneously maintaining data transmission and reception with the source gNB, and releases an RRC connection with the source gNB and performing data transmission and reception with the target gNB upon detecting one or more predefined release triggering event. In one embodiment, the target protocol stack includes a PHY layer, a MAC layer, and a RLC layer. In another embodiment, the target protocol stack further includes at least one upper layer comprising: a Packet Data Convergence Protocol (PDCP) layer and a Service Data Adaptation Protocol (SDAP) layer. In one embodiment, the reconfiguration message indicates to maintain the RRC connection with the source gNB and the source protocol stack. In another embodiment, the reconfiguration message indicates to establish a new data radio bearer (DRB) for the target gNB. In yet another embodiment, the reconfiguration message indicates to continue the data packets transmission with an existing source data radio bearer (DRB) for the target gNB. In one embodiment, the UE sends a reconfiguration response message to the target gNB upon establishing the RRC connection with the target gNB and performs data transmission and reception simultaneously with the source gNB and the target gNB. In another embodiment, the UE enables a Packet Data Convergence Protocol (PDCP) reordering, wherein the PDCP reordering is performed on PDCP packet data units (PDUs) received from the source protocol stack and the target protocol stack.

In one embodiment, the UE enables a Packet Data Convergence Protocol (PDCP) reordering, wherein the PDCP reordering is performed on PDCP packet data units (PDUs) received from the source protocol stack and the target protocol stack. In other embodiments, the one or more release triggering events comprising: receiving a RRC connection release message from the source gNB, receiving a RRC connection release message from the target gNB, receiving a RRC connection release message in response to a RRC Connection Release Request sent by the UE upon detecting a radio link failure (RLF) of the source gNB, and receiving a RRC connection release message in response to a RRC Connection Release Request sent by the UE indicating a RLF to the target gNB. In yet another embodiment, the UE triggers a Packet Data Convergence Protocol (PDCP) status report upon releasing the source RRC connection.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 illustrates an exemplary NR wireless system with centralized upper layers of the NR radio interface stacks in accordance with embodiments of the current invention.

FIG. 3 illustrates an exemplary NR wireless system supporting inter gNB mobility scenario in accordance with embodiments of the current invention.

FIG. 4 illustrates an exemplary NR wireless system supporting intra gNB mobility scenario in accordance with embodiments of the current invention.

DETAILED DESCRIPTION

Reference will now be made in detail to some embodiments of the invention, examples of which are illustrated in the accompanying drawings.

Figure 1:
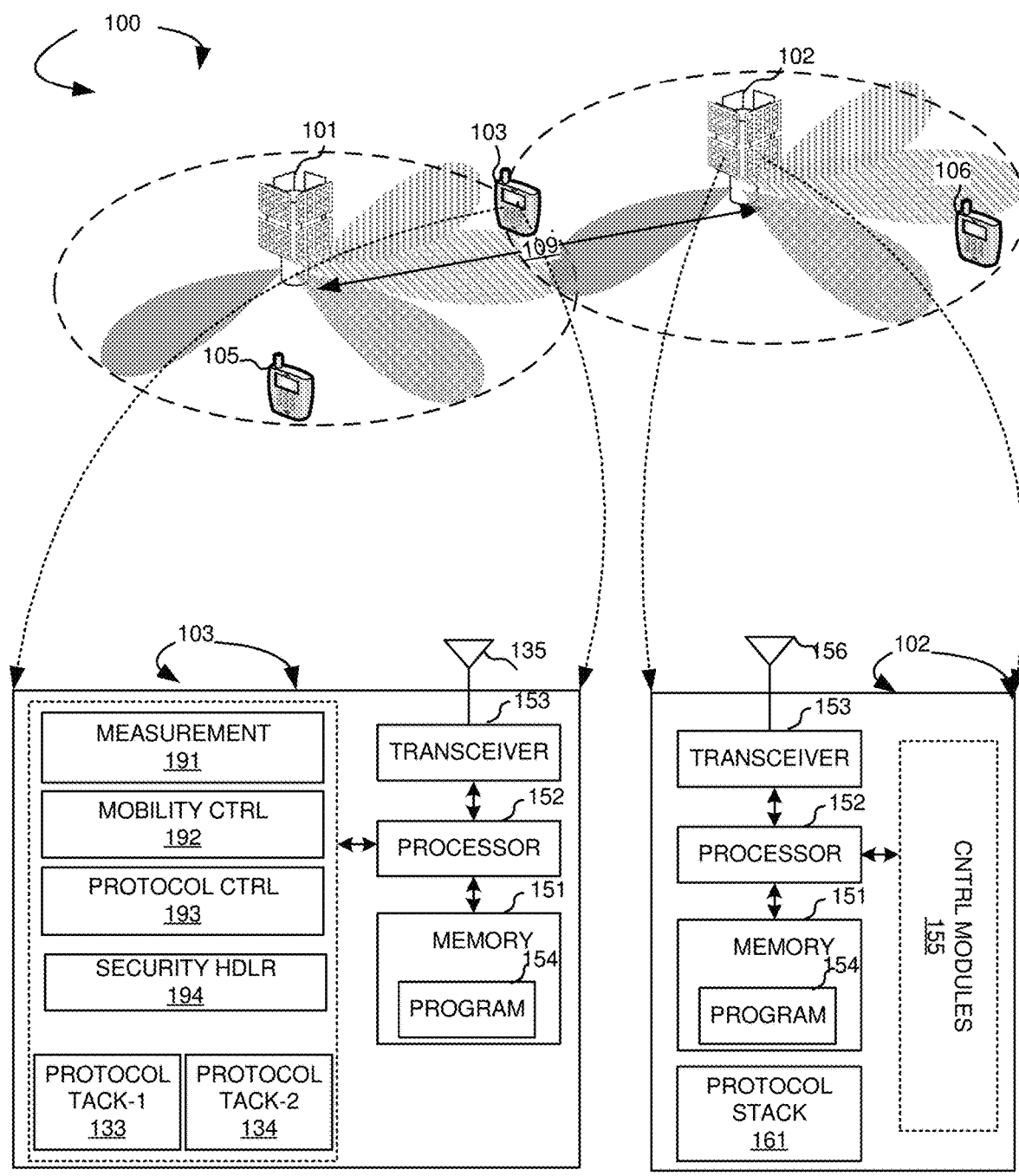
FIG. 1 is a schematic system diagram illustrating an exemplary wireless communication network with dual protocol stack for mobility interruption enhancement in accordance with embodiments of the current invention.

FIG. 1 is a schematic system diagram illustrating an exemplary wireless communication network 100 with dual protocol stack for mobility interruption enhancement in accordance with embodiments of the current invention. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 101 and gNB 102 are base stations in the NR network, the serving area of which may or may not overlap with each other. As an example, user equipment (UE) 105 or mobile station 105 is only in the service area of gNB 101 and connected with gNB 101. UE 105 is connected with gNB 101 only. Similarly, UE 106 is only in the service area of gNB 102 and connected with gNB 102. UE 106 is connected with gNB 102 only. gNB 101 is connected with gNB 102 via Xnr interface 109. UE 103 is in the overlapping service area of gNB 101 and gNB 102. In one embodiment, UE 103 is configured with dual protocol stacks and can be connected with gNB 101 and gNB 102 simultaneously.

FIG. 1 further shows simplified block diagrams of gNB 102 and mobile station/UE 103 in accordance with the current invention. gNB 102 has an antenna 156, which transmits and receives radio signals. An RF transceiver module 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 has a protocol stack 161. gNB 102 also includes a set of control modules 155 that carry out functional tasks to communicate with mobile stations. Control modules 155 may include a measurement module, a mobility controller, a protocol stack controller, and a security handler. The measurement module controls the RRM measurement through RRC configuration and receives a measurement report from the UE side. The mobility controller determines the target gNB for mobility. It coordinates with other candidate gNBs through Xnr interface, makes the HO decision and sends HO command to UE. The protocol stack controller manages the procedures to add or remove the protocol stack associated with the source gNB and the target gNB. A security hander generates one security key corresponding to the gNB. Protocol Stack includes SDAP, PDCP, RLC, MAC and PHY layers. In one embodiment, the SDAP layer is optionally configured.

UE 103 has an antenna 135, which transmits and receives radio signals. An RF transceiver module 137, coupled with the antenna, receives RF signals from antenna 135, converts them to baseband signals, and sends them to processor 132. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 137 also converts received baseband signals from processor 132, converts them to RF signals, and sends out to antenna 136. Processor 132 processes the received baseband signals and invokes different functional modules to perform features in UE 103. Memory 131 stores program instructions and data 138 to control the operations of UE 103. Antenna 135 sends uplink transmission and receives downlink transmissions to/from antenna 156 of gNB 102.

Mobile station 103 also includes a set of control modules that carry out functional tasks. A measurement module 191 controls the RRM measurement according to network's configuration. A mobility controller 192 receives RRC message for mobility, e.g. HO command and transmits the response message for HO command. A protocol stack controller 193 manages procedures to add or remove the protocol stack associated with the source gNB and the target gNB. A security handler 194 associates different security keys to the corresponding gNBs. Dural-protocol stack is enabled for UE 103. Protocol stack-1 133 and protocol stack-2 134 are each configured with PHY layer, MAC layer, radio link control (RLC) layer, Packet Data Convergence Protocol (PDCP) layer and a Service Data Adaptation Protocol (SDAP) layer. In one embodiment, the SDAP layer is optional. In one embodiment, there is one PDCP reordering function, which receives the PDCP packet data units (PDUs) from both the target gNB and the source gNB, reorders those PDCP PDUs based on the SN/COUNT and delivers the PDCP SDUs to upper layer in-sequence order. In one embodiment, the PDCP reordering is enabled upon reception of HO command. In one embodiment, the PDCP reordering is performed by the PDCP layer; in another embodiment, the PDCP reordering is performed by the SDAP layer. Please note that the modules in FIG. 1 can be implemented by circuitries.

FIG. 2 illustrates an exemplary NR wireless system with centralized upper layers of the NR radio interface stacks in accordance with embodiments of the current invention. Different protocol split options between central unit and lower layers of gNB nodes may be possible. The functional split between the central unit and lower layers of gNB nodes may depend on the transport layer. Low performance transport between the Central Unit and lower layers of gNB nodes can enable the higher protocol layers of the NR radio stacks to be supported in the Central Unit, since the higher protocol layers have lower performance requirements on the transport layer in terms of bandwidth, delay, synchronization and jitter. In one embodiment, SDAP and PDCP layer are located in the central unit, while RLC, MAC and PHY layers are located in the distributed unit. A Core unit 201 is connected with one central unit 211 with gNB upper layer 252. In one embodiment, gNB upper layer 252 includes the PDCP layer and optionally the SDAP layer. Central unit 211 is connected with distributed units 211, 212, and 213. Distributed units 221, 222, and 223 each corresponds to a cell 231, 232, and 233, respectively. The distributed units, such as 221, 222 and 223 includes gNB lower layers 251. In one embodiment, gNB lower layers 251 include the PHY, MAC and the RLC layers.

FIG. 3 illustrates an exemplary NR wireless system supporting inter gNB mobility scenario in accordance with embodiments of the current invention. The intra 5G intra-RAT handover is normally based on Xn-based handover. HO is performed between gNBs through Xn interface, which are connected to the NR core network. Each gNB has the protocol stacks including SDAP, PDCP, RLC, MAC and PHY layers. A gNB 311 and a gNB 312 are both 5G gNBs with a protocol stack 351 and 352, respectively. gNB 311 and gNB 312 connects with the Core 301 via NG connection. gNB 311 and gNB 312 connect with each other via Xn interface. Protocol stacks 351 and 352 includes PHY, MAC, RLC, PDCP and optionally SDAP.

FIG. 4 illustrates an exemplary NR wireless system supporting intra-system inter-RAT handover with E-UTRA in accordance with embodiments of the current invention. The intra-system inter RAT handover is normally based on Xn-based handover. HO is performed between gNB and eLTE/eNB through Xn interface, which is connected to the NR corn network. gNB has the protocol stack including SDAP, PDCP, RLC, MAC and PHY layers, while eLTE/eNB has the protocol stack including PDCP, RLC, MAC and PHY layers. A gNB 411 is a 5G gNB with a protocol stack 451. A base station 412 is LTE/eLTE eNB with a protocol stack 452. gNB 411 and eNB 412 connect with the Core 401 via NG connection. gNB 411 and eNB 412 connect with each other via Xn interface. Protocol stacks 451 includes PHY, MAC, RLC, PDCP and optionally SDAP. Protocol stack 452 includes PHY, MAC, RLC and PDCP.

Figure 5:
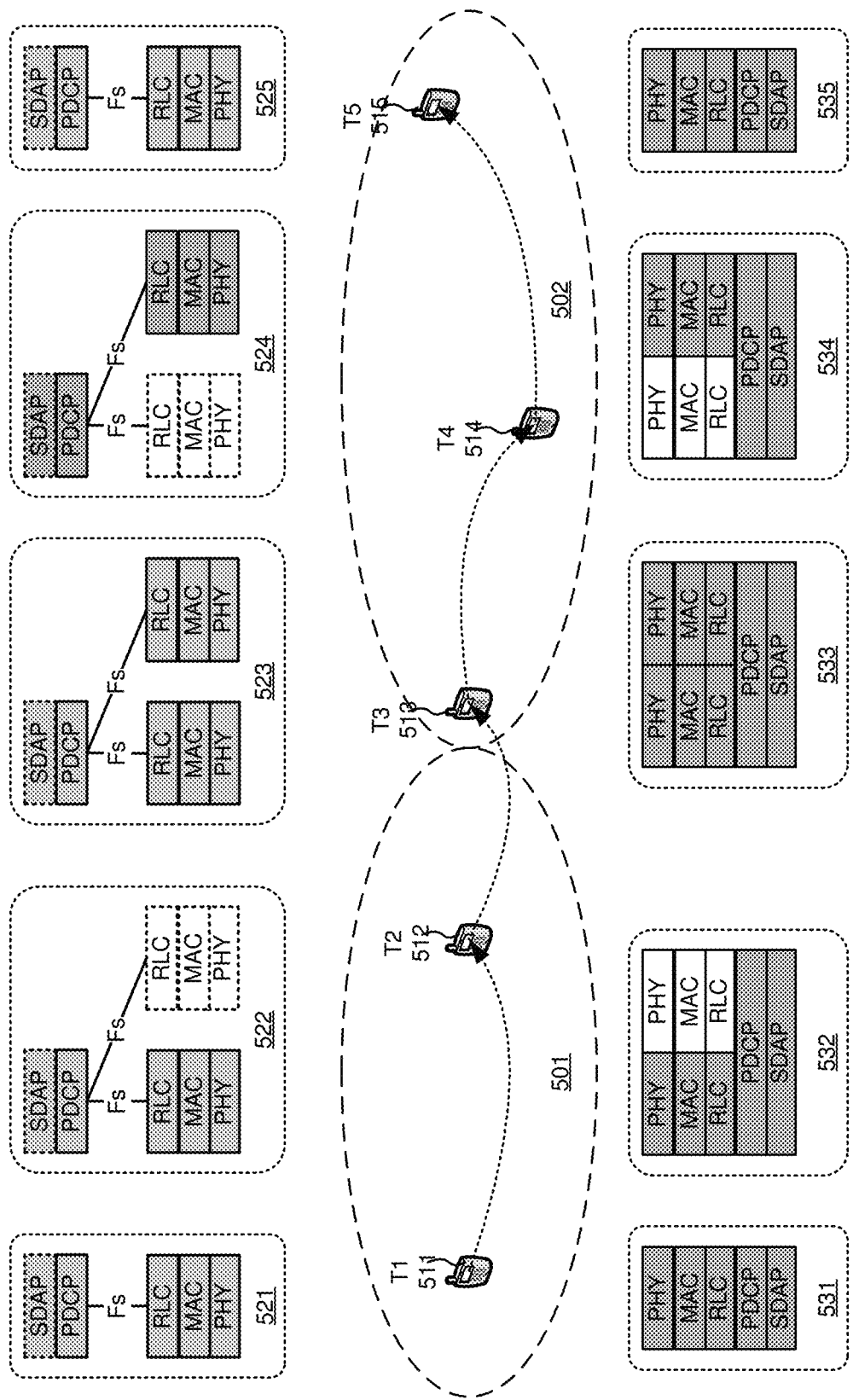
FIG. 5 illustrates an exemplary mobility procedure with dual protocol stack between two gNBs with a common central unit in accordance with embodiments of the current invention.

FIG. 5 illustrates an exemplary mobility procedure with dual protocol stack between two gNBs with a common central unit in accordance with embodiments of the current invention. Cell 501 and cell 502 are controlled with different gNBs but with one common central unit (CU), which includes the PDCP layer and the optionally the SDAP layer. The UE moves among different distributed units (DUs), which include the PHY, MAC and the RLC layers. SDAP and PDCP layers are common for all DUs, and located in the CU. Each DU has RLC, MAC and PHY layers. Cell 501 is covered by DU1 and Cell 502 is covered by DU2. At T1 511, UE is connected with DU1 configured as 521. UE protocol 531 including SDAP, PDCP, RLC, MAC and PHY layers are established at the UE side, which has the peer layer at the network side. At T2 512, the UE moves to the cell edge. The CU determines to perform HO for the UE from cell 501 to cell 502. In order to minimize the mobility interruption, simultaneous data transmission/reception with cell 501 and cell 502 should be supported. A target protocol stack with RLC, MAC and PHY layers for DU2 are established. The gNB protocol stack 522 includes the source protocol stack and the target protocol stack. The HO command indicating to establish RLC and create MAC layer at the UE side without PDCP re-establishment, e.g. through RLC bearer addition. The UE establishes dual stack 532 with target DU layers of PHY, MAC, and RLC. The target DU stack is not active at T2 512. At T3 513, after establishing the protocol stack for the target cell, PDCP reordering function is enabled. PDCP PDUs of a DRB are transmitted through the two RLC entities located in DU1 and DU2 respectively. The common PDCP entity at the UE side performs PDCP reordering on the PDCP PDUs received from the two RLC entities. The network stack of 523 having the source and target DU stack both active connecting to the CU stack. The UE protocol stack 533 having both the source and target DU stack ready with a common PDCP layer and optionally a common SDAP layer. At T4 514, when UE moves out of the coverage of the source cell, the radio link with the source cell is not reliable enough for data packets transmission, e.g. due to radio link failure (RLF). The CU stops data transmission through DU1. The source DU for UE at protocol stack 534 is not active with the target DU stack active. The UE only receives PDCP PDUs from the RLC entity corresponding to the target cell. The gNB also deactivated the source DU as in protocol stack 524. At time T5 515, the protocol stack of source cell is removed, e.g. through RLC bearer removal. The UE protocol stack 535 and the gNB protocol stack 525 are activated with the target protocol stack only.

Figure 6:
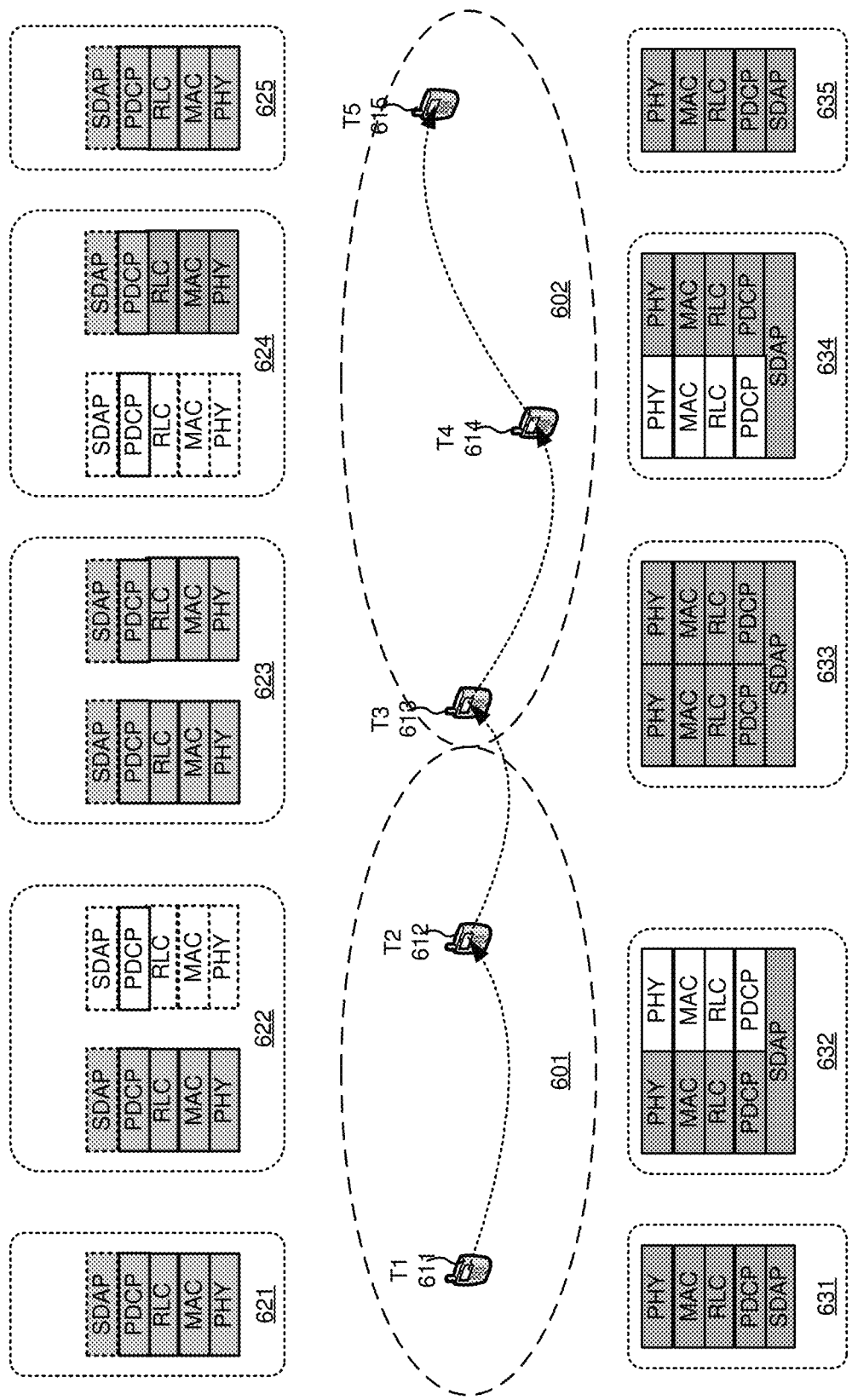
FIG. 6 illustrates an exemplary mobility procedure with dual protocol stack between two gNBs with different central units in accordance with embodiments of the current invention.

FIG. 6 illustrates an exemplary mobility procedure with dual protocol stack between two gNBs with different central units in accordance with embodiments of the current invention. Cell 601 and cell 602 are controlled with different gNBs with different central units (CUs), which includes the PDCP layer and optionally the SDAP layer. Each gNB has the protocol stack of SDAP, PDCP, RLC, MAC and PHY layers. At T1 611, UE is connected with gNB1 through protocol stack 631. SDAP, PDCP, RLC, MAC and PHY layers is established at the UE side, which has the peer layer at gNB1 with protocol stack 621. At T2 612, the UE moves to the cell edge. gNB1 determines to perform HO for the UE to gNB2. In order to minimize the mobility interruption, simultaneous data transmission/reception with gNB1 and gNB2 should be supported. A target protocol stack with SDAP, PDCP, RLC, MAC and PHY layers for gNB2 are established. The gNB protocol stack 622 has a source protocol stack and a target protocol stack, with the data transmission through the source protocol stack. The HO command indicating to establish SDAP, PDCP, RLC and create MAC layer at the UE side. Similarly, the UE protocol stack 632 has a source protocol stack and a target protocol stack. At T3 613, after establishing the protocol stack for the target gNB, PDCP reordering function is enabled. PDCP PDUs of a DRB are transmitted through the two PDCP entities located in gNB1 and gNB2 respectively. The gNB protocol stacks 623 includes the source protocol stack of gNB1 and the target protocol stack of gNB2. A PDCP reordering function at the UE side performs PDCP reordering on the PDCP PDUs received from the two PDCP entities. UE protocol stack 633 also has both the source and target protocol stacks active. At T4 614, when UE moves out of the coverage of the source cell, the radio link with the source cell is not reliable enough for data packets transmission, e.g. due to RLF. The gNB1 stops data transmission. The gNB protocol stack 624 has the source protocol stack of gNB1 deactivated and the target protocol stack of gNB2 activated. UE only receives PDCP PDUs from gNB2 through protocol stack 634 with the source protocol stack deactivated and the target protocol stack activated. At time T5 615, the protocol stack of gNB1 is removed. The UE protocol stack 635 with only the target protocol stack. gNB protocol stack 625 only includes the target protocol stack.

Figure 7A:
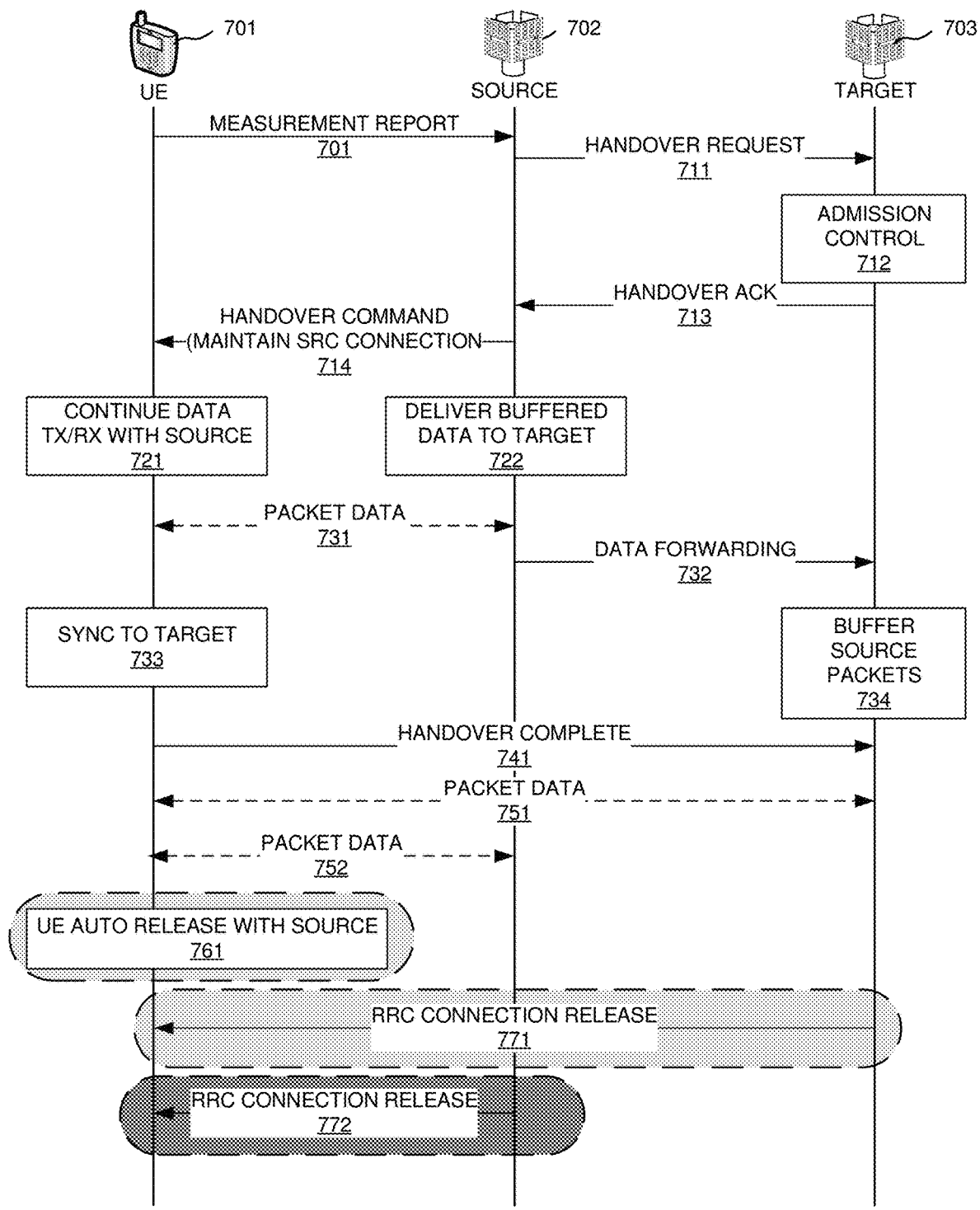
FIG. 7A shows an exemplary message diagram for utilizing dual protocol stacks to achieve 0 ms mobility interruption with network-initiated release in accordance with embodiments of the current invention.

FIG. 7A shows an exemplary message diagram for utilizing dual protocol stacks to achieve 0 ms mobility interruption with network-initiated release in accordance with embodiments of the current invention. UE 701 is connected with gNB 702 as the source gNB. gNB 703 is a handover target gNB for UE 701. At step 711, UE sends measurement reports to gNB 702. At step 712, the source gNB 701 initiates handover and issues a Handover Request over the Xn interface to target gNB 703. At step 713, the target gNB 703 performs admission control. At step 714, the target gNB 703 provides the RRC configuration as part of the Handover Acknowledgement. At step 715, the source gNB 702 provides the RRC configuration to the UE 701 in the Handover Command. The HO command indicates to maintain RRC connection and the protocol stack with the source gNB 702. After receiving the HO command, at step 721 UE 701 keeps the RRC connection and the protocol stack including SDAP, PDCP, RLC, MAC and PHY with the source gNB, continuing data packet transmission reception with it. In order to support the simultaneous transmission, the source gNB 702, at step 722, keeps a number of PDCP SDUs and forwards other PDCP SDUs to the target gNB 703. At step 731, UE 701 continues the data packet transmission and reception with source gNB 702. Furthermore, at step 732, source gNB 702 reserves a number of SNs for the un-transmitted PDCP SDUs and forwards the SN status to the target gNB 703. Target gNB 703 at step 734 buffers the source packet data received from source gNB 702. Then the UE 701, at step 733, syncs to the target gNB 703 and performs random access towards the target gNB 703, and continues data packets transmission with the source gNB simultaneously. At step 741, the UE 701 establishes the RRC connection to the target gNB 703 and replies the Handover Complete. Then data packets transmission through the two protocol stacks for source gNB 701 at step 752 and target gNB 703 step 751 are performed simultaneously. In this case, the HO mechanism triggered by RRC requires the UE not to reset the MAC entity, re-establish RLC and re-establish PDCP. RRC managed handovers with and without PDCP entity re-establishment are both supported. Data forwarding, in-sequence delivery and duplication avoidance at handover can be guaranteed when the target gNB uses the same DRB configuration as the source gNB. Finally, the connection with the source gNB is released when one or more pre-defined triggering event occur. In one embodiment, the protocol stack and the RRC connection with source gNB are released when the data buffered from the source gNB are all successfully transmitted. At step 761, the UE automatically release the connection with the source gNB 702. In another embodiment, the connection is released by an explicit RRC message transmitted either by the source gNB 702 or the target gNB 703 as shown in step 771. In yet another embodiment, at step 772, the RRC connection release message can alternatively come from the source gNB 702.

Figure 7B:
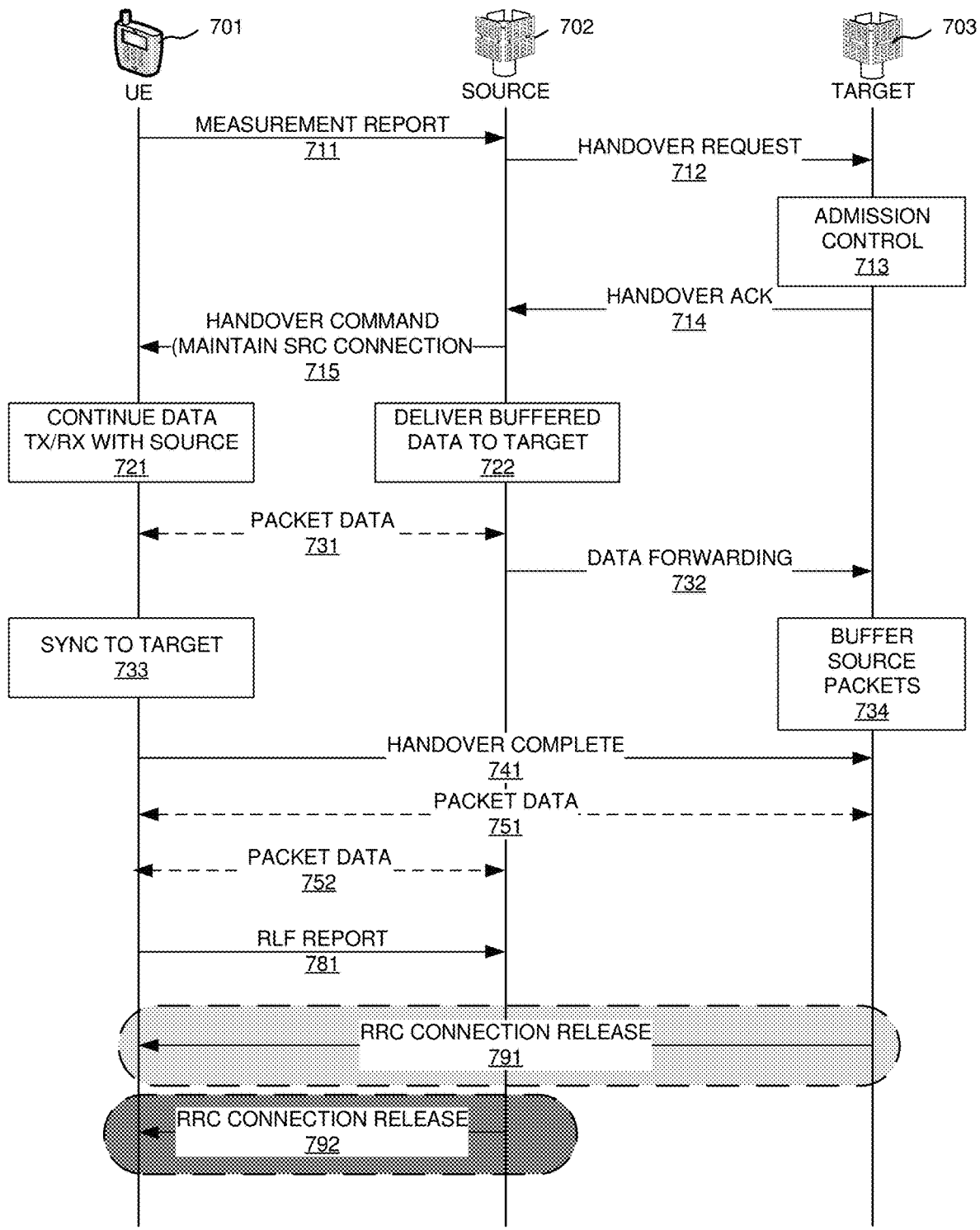
FIG. 7B shows an exemplary message diagram for utilizing dual protocol stacks to achieve 0 ms mobility interruption with RLF-triggered release in accordance with embodiments of the current invention.

FIG. 7B shows an exemplary message diagram for utilizing dual protocol stacks to achieve 0 ms mobility interruption with RLF-triggered release in accordance with embodiments of the current invention. UE 701 is connected with gNB 702 as the source gNB. gNB 703 is a handover target gNB for UE 701. The same as shown in FIG. 7A, the UE performs handover with dual protocol stack to achieve interruption enhancement from step 711 to 751 and 752 when the handover from source gNB 702 to the target gNB 703 is completed with the data exchanging simultaneously with both the source gNB 702 and target gNB 703. In one embodiment, the protocol stack and the RRC connection with the source gNB are released autonomously by the UE when RLF occurs, or the measurement results of the radio link with the source gNB are below a threshold. In one embodiment, at step 791, the connection is released by an explicit RRC message transmitted by the target gNB 703, which is the response message of the RLF report from the UE side. In another embodiment, at step 792, the connection is released by an explicit RRC message transmitted by the source gNB 702, which is the response message of the RLF report from the UE side.

Figure 8:
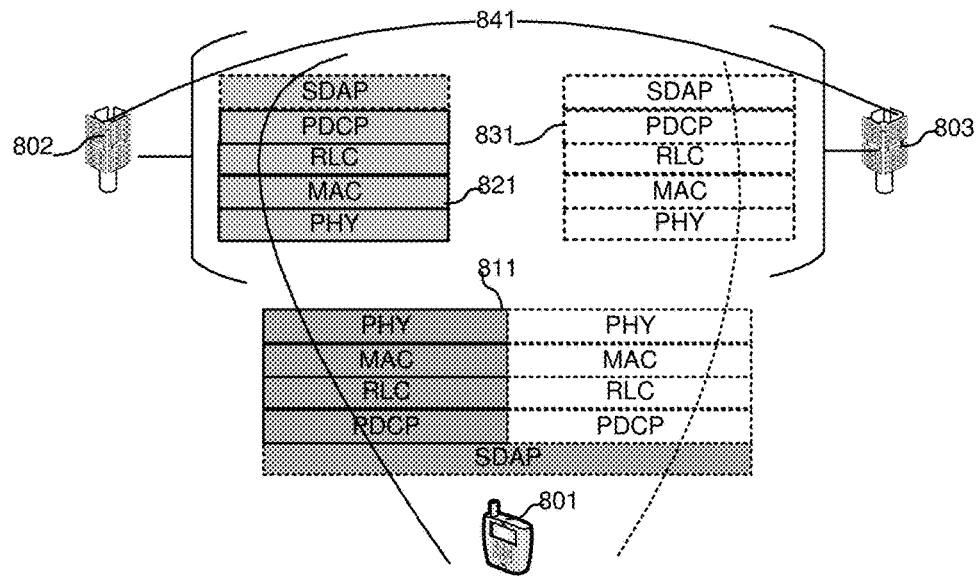
FIG. 8 illustrates an exemplary dual protocol stacks in accordance with embodiments of the current invention.

FIG. 8 illustrates an exemplary dual protocol stacks in accordance with embodiments of the current invention. In one embodiment, a new DRB is established at the target gNB. In this case, different DRBs are transmitted with different protocol stacks from the source gNB and the target gNB respectively. PDCP reordering is not needed. UE 801, with protocol stack 811 is connected with source gNB 802, with protocol stack 821. A DRB between UE 801 and source gNB 802 is established. Upon handover to a target gNB 803, with a protocol stack 831, UE 801 established a DRB with target gNB 803 as well. There is no re-ordering required for this configuration. Source gNB 802 is connected with target gNB 803 via Xn interface 841.

Figure 9:
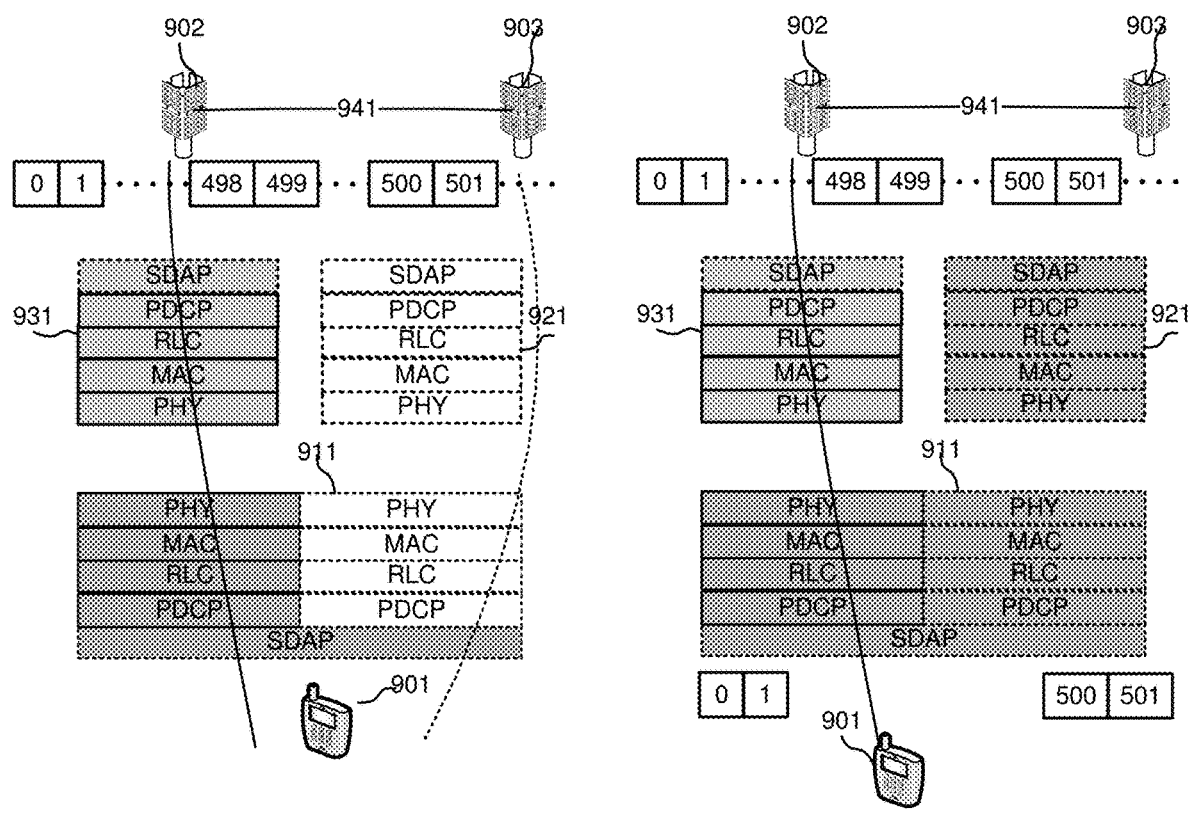
FIG. 9 illustrates an exemplary dual protocol stacks handling with PDCP reordering upon one protocol stack addition in accordance with embodiments of the current invention.

FIG. 9 illustrates an exemplary dual protocol stacks handling with PDCP reordering upon one protocol stack addition in accordance with embodiments of the current invention. UE 901, with protocol stack 911 establishes a connection with source gNB 902 with source protocol stack 931. Upon reception of HO command indicating establishing of the new protocol stack for the target gNB 903, with protocol stack 921, UE establishes SDAP, PDCP, RLC and creates MAC entity. Meanwhile, the PDCP reordering function is enabled. The source gNB 902 reserves a range of SN (e.g. 0~499) for PDCP SDU transmission through the source gNB and forwards the remaining PDU #500 and above PDCP SDUs to the target gNB 903. Furthermore, source gNB 902 sends the SN status to the target gNB 903, e.g. starting SN is 500. Then UE receives PDCP PDUs from both of the PDCP entities corresponding to the source gNB and target gNB. For example, PDCP PDUs #0 and #1 are received from the source gNB, while PDCP PDUs #500 and

501 are received from the target gNB. Since the PDCP PDUs are received out of order, PDCP reordering function is used to guarantee in-sequence delivery and duplication avoidance. When the PDCP PDUs with SN from 2~499 are received, all the stored PDCP SDUs will be delivered to the upper layer.

Figure 10:
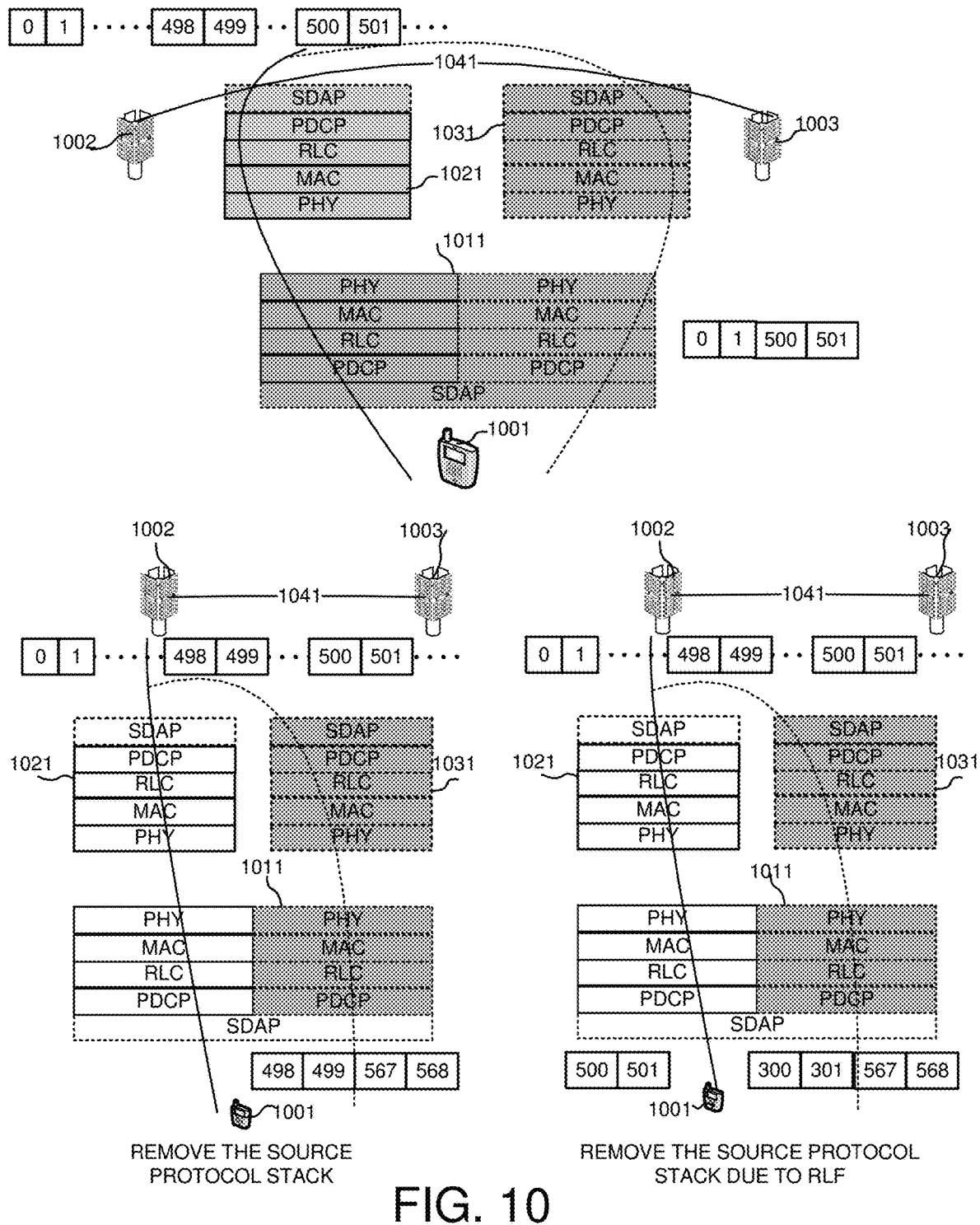
FIG. 10 illustrates an exemplary dual protocol stacks handling with PDCP reordering upon one protocol stack removal in accordance with embodiments of the current invention.

FIG. 10 illustrates an exemplary dual protocol stacks handling with PDCP reordering upon one protocol stack removal in accordance with embodiments of the current invention. UE 1001, with protocol stack 1011, is connected source gNB 1002 with protocol stack 1021. PDCP PDUs #0 and #1 are received from the source gNB 1002, while PDCP PDUs #500 and #501 are received from the target gNB 1003 with a protocol stack 1031. Since the PDCP PDUs are received out of order, PDCP reordering function is used to guarantee in-sequence delivery and duplication avoidance. Only when the PDCP PDUs with SN from 2~499 are received, all the stored PDCP SDUs will be delivered to the upper layer. In one embodiment, the UE has one source PDCP layer and one target PDCP layer in the protocol stack 1011. In another embodiment, the UE has one PDCP layer for both the source gNB and the target gNB. The reordering procedure and the security key features are performed by the common PDCP layer. In one embodiment, it's possible that all the resource PDCP SDUs at the source gNB can be successfully delivered to the UE. In this case, the RRC connection of the source gNB and the protocol stack 1021 is explicitly released by either the source gNB or the target gNB by RRCConnectionRelease message. Upon reception of the RRCConnectionRelease message, the UE releases the RRC connection with the source gNB 1002 and releases the protocol stack 1021. In one embodiment, it's possible that RLF occurs before all the reserved PDCP SDUs are successfully delivered to the UE. In one example, all PDCP SDUs with SN number up to #301 are successfully delivered to the UE. The PDCP SDUs with SN less than and equal to #300 are delivered to the upper layer. The remaining PDCP SDUs with SN from #301 to #499 can't be transmitted by the source gNB anymore. So those PDCP SDUs are forwarded to the target gNB with update SN status. In one embodiment, UE sends RLF report of the source gNB to the target gNB. The target gNB responds the UE with RRCConnectionRelease message to release RRC connection with the source gNB 1002. In one embodiment, UE 1001 releases the RRC connection with the source gNB 1002 autonomously after sending the RLF report to the target gNB 1003.

Figure 11:
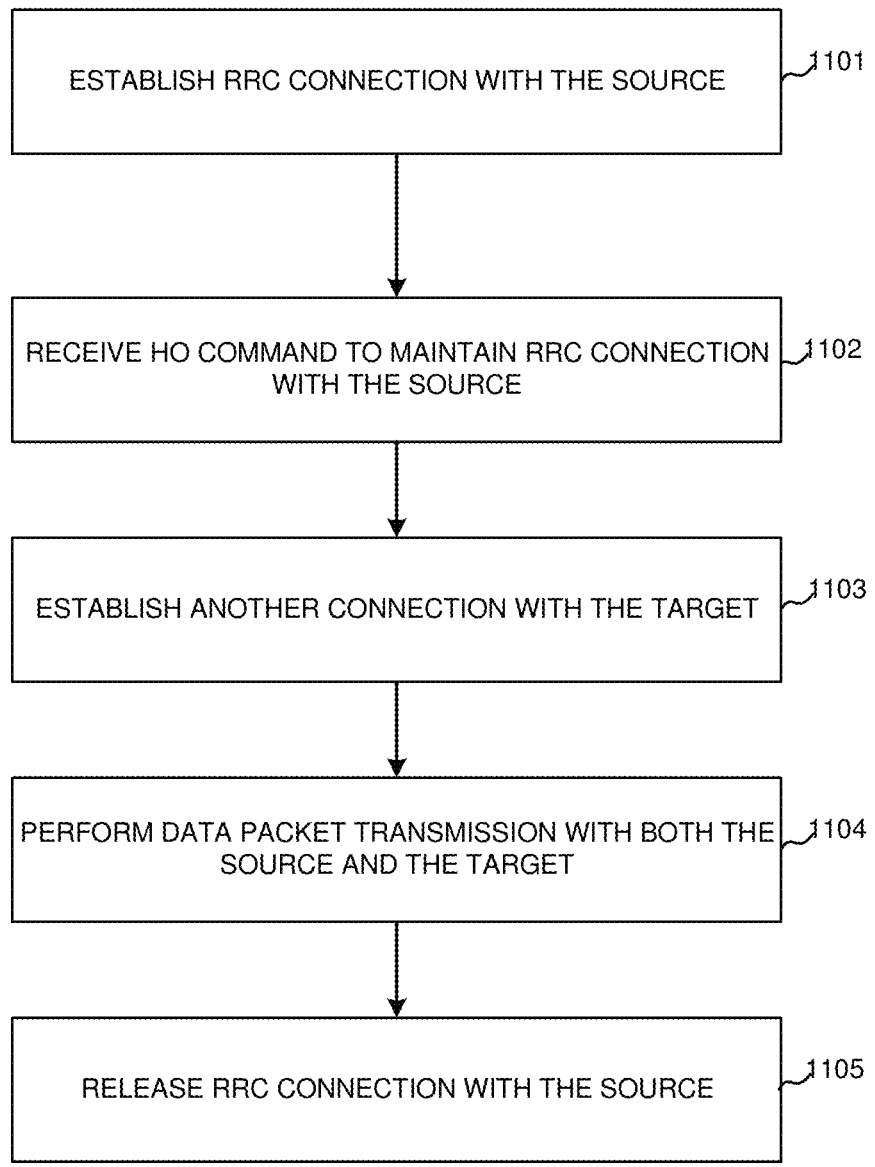
FIG. 11 illustrates an exemplary flowchart for protocol stack addition to achieve 0 ms mobility interruption during inter-gNB HO in accordance with embodiments of the current invention.

FIG. 11 illustrates an exemplary flowchart for protocol stack addition to achieve 0 ms mobility interruption during inter-gNB HO in accordance with embodiments of the current invention. At step 1101, the UE establishes RRC connection with the source gNB. At step 1102, the UE receives HO command indicating to maintain RRC connection and protocol stack with the source gNB when performing HO towards the target gNB. At step 1103, the UE establishes another RRC connection with the target gNB and establishes protocol stack with SDAP, PDCP, RLC, MAC and PHY with the target gNB. At step 1104, the UE performs data transmission/reception with the source gNB and the target gNB simultaneously. Finally, at step 1105, the UE releases the RRC connection with source gNB when one or more release triggering event is detected. The release triggering events comprising: the reserved PDCP SDUs are successfully delivered, or when RLF occurs on the radio link with source gNB and triggers an RRCConnectRelease message from either the source gNB or the target gNB, or when the source gNB or the target gNB explicitly sends an RRCConnectRelease message to the UE.

Figure 12:
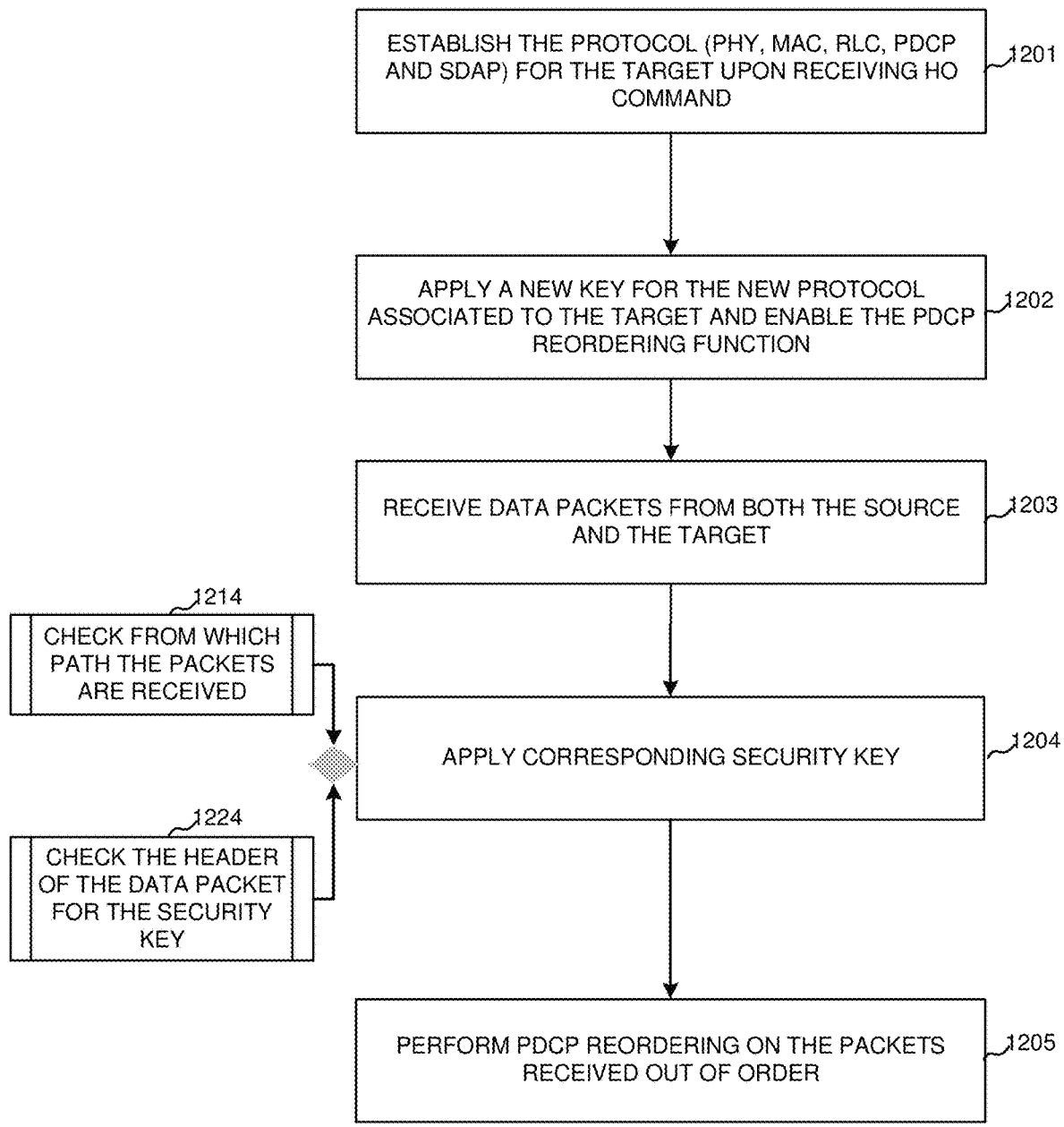
FIG. 12 illustrates an exemplary flowchart for different security keys handling to achieve 0 ms mobility interruption during inter-gNB HO in accordance with embodiments of the current invention.

FIG. 12 illustrates an exemplary flowchart for different security keys handling to achieve 0 ms mobility interruption during inter-gNB HO in accordance with embodiments of the current invention. At step 1201, after reception of HO command, the UE establishes the protocol stack with the target gNB. At step 1202, the UE applies a new security key associated with the target gNB and enable the PDCP reordering function. At step 1203, the UE starts to transmit/receive data packets from both the source and the target gNB. At step 1204, the UE applies the corresponding security key. There are different options to apply the security key. PDCP entities corresponding to different gNBs apply the different keys accordingly. In one embodiment, at step 1214, if the PDCP layer is common for both the source gNB and the target gNB, UE checks from which RLC entity each PDCP PDU is received and apply the corresponding security key on the received PDCP PDU. In another embodiment, alternatively, at step 1224, the UE determines which key to use for each PDCP PCU based on the flag in the PDCP PDU header. At step 1205, the UE performs PDCP reordering on the packets received out of order.

Figure 13:
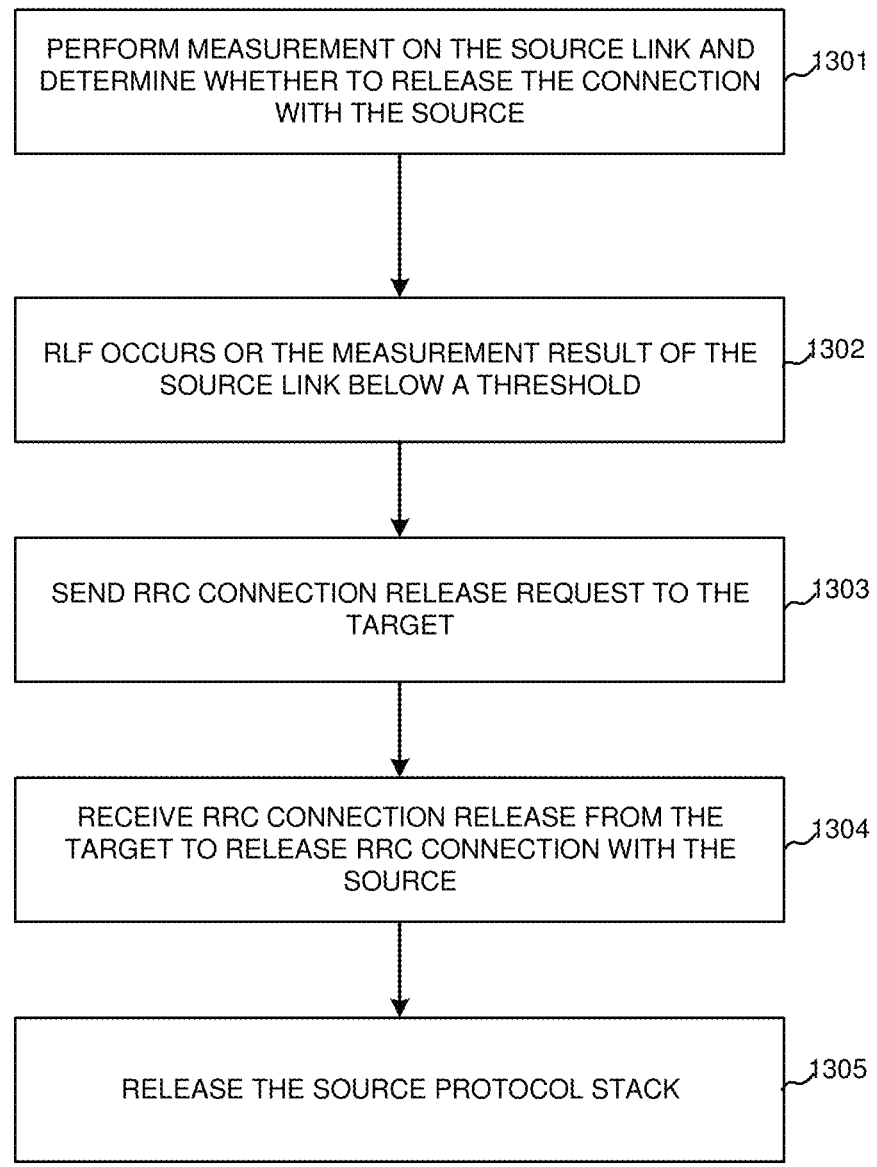
FIG. 13 illustrates an exemplary flowchart for protocol stack removal to achieve 0 ms mobility interruption during inter-gNB HO in accordance with embodiments of the current invention.

FIG. 13 illustrates an exemplary flowchart for protocol stack removal to achieve 0 ms mobility interruption during inter-gNB HO in accordance with embodiments of the current invention. At step 1301, the UE performs measurement on the source link and determines whether to release the connection with the source gNB. At step 1302, the UE detects RLF or the measurement result of the source link to be below a threshold. At step 1303, the UE sends an RRCConnectionReleaseRequest to the target gNB. At step 1304, the UE receives an RRCConnectionRelease message from the target gNB to release the RRC Connection with the source gNB. At step 1305, the UE releases the source protocol stack.

Figure 14:
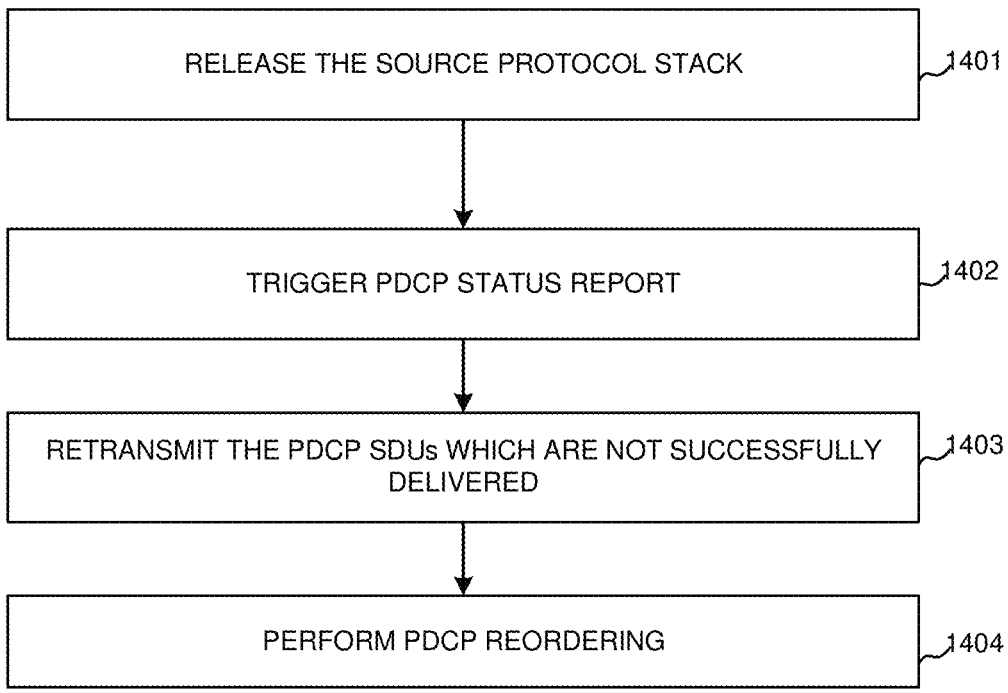
FIG. 14 illustrates an exemplary flowchart to trigger PDCP status report upon protocol stack removal during inter-gNB HO in accordance with embodiments of the current invention.

FIG. 14 illustrates an exemplary flowchart to trigger PDCP status report upon protocol stack removal during inter-gNB HO in accordance with embodiments of the current invention. Upon releasing of the protocol stack of the source gNB, a PDCP status report is triggered for PDCP SDU retransmission. The PDCP SDUs which are not successfully delivered will be retransmitted by the target gNB. UE performs PDCP reordering to guarantee the in-sequence delivery of the PDCP SDUs to the upper layer. At step 1401, the UE releases the source protocol stack. At step 1402, the UE triggers PDCP status report. At step 1403, the UE retransmits the PDCP SDUs, which are not successfully delivered. At step 1404, the UE performs PDCP reordering.

Figure 15:
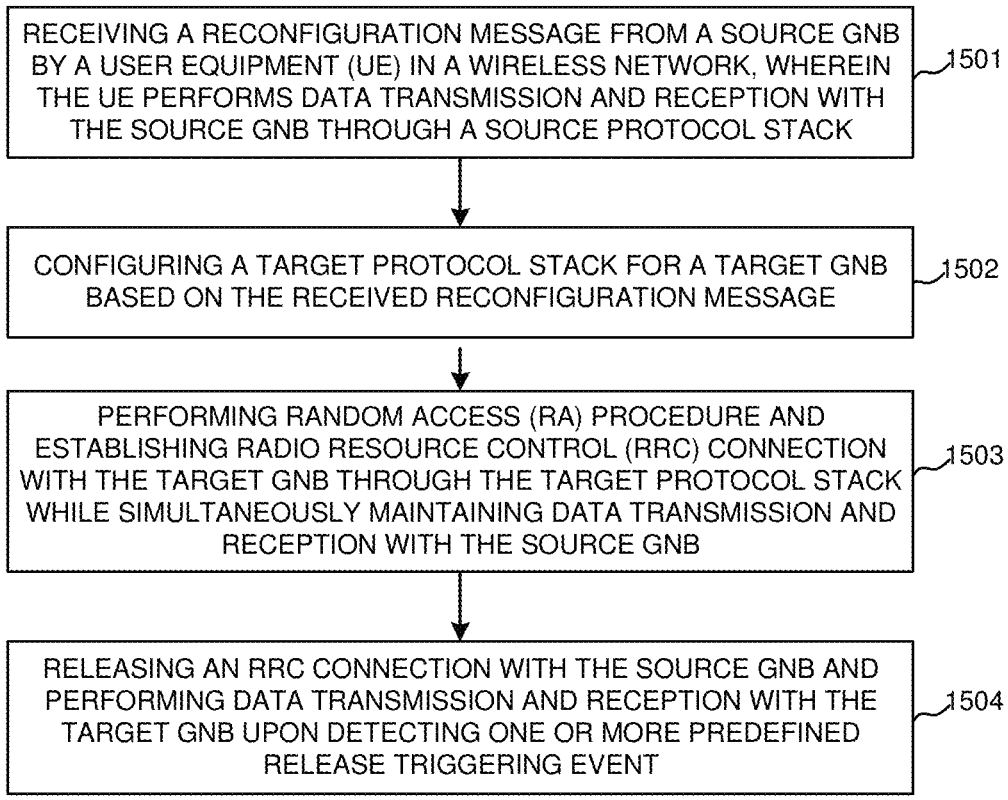
FIG. 15 illustrates an exemplary flowchart for the UE to perform data transmission with dual protocol stack to reduce interruption in accordance with embodiments of the current invention.

FIG. 15 illustrates an exemplary flowchart for the UE to perform data transmission with dual protocol stack to reduce interruption in accordance with embodiments of the current invention. At step 1501, the UE receives a reconfiguration message from a source gNB in a wireless network, wherein the UE performs data transmission and reception with the source gNB through a source protocol stack. At step 1502, the UE configures a target protocol stack for a target gNB based on the received reconfiguration message. At step 1503, the UE performs RA procedure and establishing RRC connection with the target gNB through the target protocol stack while simultaneously maintaining data transmission and reception with the source gNB. At step 1504, the UE releases an RRC connection with the source gNB and performing data transmission and reception with the target gNB upon detecting one or more predefined release triggering event.

Although the present invention has been described in connection with certain specific embodiments for instructional purposes, the present invention is not limited thereto.

Accordingly, various modifications, adaptations, and combinations of various features of the described embodiments can be practiced without departing from the scope of the invention as set forth in the claims.

What is claimed is:

1. A method comprising:
receiving a reconfiguration message from a source gNB by a user equipment (UE) in a wireless network, wherein the UE performs data transmission and reception with the source gNB through a source protocol stack;
configuring a new target protocol stack for a target gNB based on the received reconfiguration message, wherein the new target protocol is concurrent with the source protocol stack, and wherein the target protocol stack is configured with an existing source data radio bearer (DRB) configuration for the target gNB;
performing random access (RA) procedure and establishing radio resource control (RRC) connection with the target gNB through the target protocol stack while simultaneously maintaining data transmission and reception with the source gNB through the source protocol stack;
reordering PDCP packet data units (PDUs) received from the source protocol stack and the target protocol stack by a UE PDCP entity; and
releasing an RRC connection with the source gNB and performing data transmission and reception with the target gNB upon detecting one or more predefined release triggering event.

2. The method of claim 1, wherein the target protocol stack includes a PHY layer, a MAC layer, a radio link control (RLC) layer.

3. The method of claim 1, wherein the target protocol stack further includes at least one upper layer comprising: a Packet Data Convergence Protocol (PDCP) layer and a Service Data Adaptation Protocol (SDAP) layer.

4. The method of claim 1, wherein the reconfiguration message indicates to maintain the RRC connection with the source gNB and the source protocol stack.

5. The method of claim 1, further comprising:
sending a reconfiguration response message to the target gNB upon establishing the RRC connection with the target gNB; and
performing data transmission and reception simultaneously with the source gNB and the target gNB.

6. The method of claim 1, further comprising: applying a first security key for the source protocol stack and applying a second security key for the target protocol stack.

7. The method of claim 1, wherein the one or more predefined release triggering events comprising: receiving a RRC connection release message from the source gNB, receiving a RRC connection release message from the target gNB, receiving a RRC connection release message in response to a RRC Connection Release Request sent by the UE upon detecting a radio link failure (RLF) of the source gNB, and receiving a RRC connection release message in response to a RRC Connection Release Request sent by the UE indicating a RLF to the target gNB.

8. The method of claim 1, further comprising: triggering a Packet Data Convergence Protocol (PDCP) status report upon releasing the source RRC connection.

9. A user equipment (UE) comprising:
a radio frequency (RF) transceiver that transmits and receives radio signals in a wireless network;
a source protocol stack and a target protocol stack that communicate with the RF transceiver;
a memory; and
a processor coupled to the memory, the source protocol stack and the source protocol stack, the processor configured to receive a reconfiguration message from a source gNB, wherein the UE performs data transmission and reception with the source gNB through the source protocol stack, configure a new target protocol stack for a target gNB based on the received reconfiguration message, wherein the new target protocol is concurrent with the source protocol stack, and wherein the target protocol stack is configured with an existing source data radio bearer (DRB) configuration for the target gNB, perform random access (RA) procedure and establishes radio resource control (RRC) connection with the target gNB through the target protocol stack while simultaneously maintaining data transmission and reception with the source gNB through the source protocol stack, reorder PDCP packet data units (PDUs) received from the source protocol stack and the target protocol stack by a UE PDCP entity, and release an RRC connection with the source gNB and performing data transmission and reception with the target gNB upon detecting one or more predefined release triggering event.

10. The UE of claim 9, wherein the target protocol stack includes a PHY layer, a MAC layer, a radio link control (RLC) layer.

11. The UE of claim 9, wherein the target protocol stack further includes at least one upper layer comprising: a Packet Data Convergence Protocol (PDCP) layer and a Service Data Adaptation Protocol (SDAP) layer.

12. The UE of claim 9, wherein the reconfiguration message indicates to maintain the RRC connection with the source gNB and the source protocol stack.

13. The UE of claim 9, wherein the processor is further configured to send a reconfiguration response message to the target gNB upon establishing the RRC connection with the target gNB, and perform data transmission and reception simultaneously with the source gNB and the target gNB.

14. The UE of claim 9, wherein the processor is further configured to apply a first security key for the source protocol stack and applying a second security key for the target protocol stack.

15. The UE of claim 9, wherein the one or more predefined release triggering events comprising: receiving a RRC connection release message from the source gNB, receiving a RRC connection release message from the target gNB, receiving a RRC connection release message in response to a RRC Connection Release Request sent by the UE upon detecting a radio link failure (RLF) of the source gNB, and receiving a RRC connection release message in response to a RRC Connection Release Request sent by the UE indicating a RLF to the target gNB.

16. The UE of claim 9, wherein the processor is further configured to trigger a Packet Data Convergence Protocol (PDCP) status report upon releasing the source RRC connection.

* * * * *

UNITED STATES PATENT AND TRADEMARK OFFICE
CERTIFICATE OF CORRECTION

PATENT NO. : 11,452,016 B2
APPLICATION NO. : 16/989992
DATED : September 20, 2022
INVENTOR(S) : Yuanyuan Zhang and Chun-Fan Tsai It is certified that error appears in the above-identified patent and that said Letters Patent is hereby corrected as shown below:

In the Claims

Column 12 Line 8, the word "source" needs to be changed to "target"

Signed and Sealed this
Fifteenth Day of August, 2023

Katherine Kelly Vidal
*Director of the United States Patent and Trademark Office*